No. 761,331. PATENTED MAY 31, 1904.
T. STITES.
BURNER.
APPLICATION FILED JULY 28, 1902.
NO MODEL. 5 SHEETS—SHEET 4.
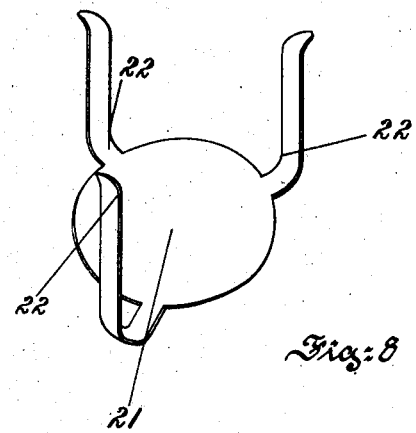
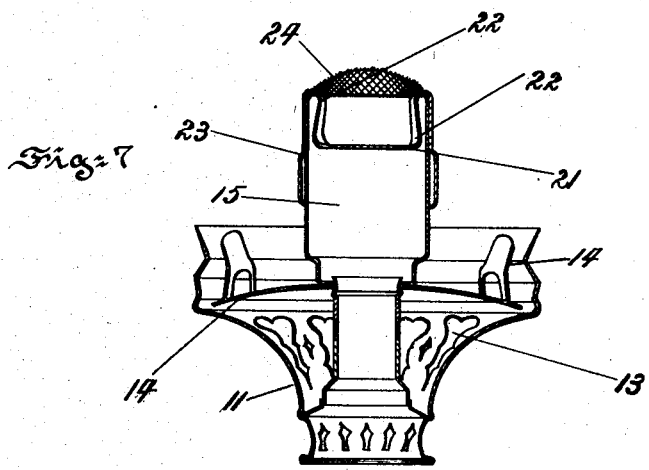

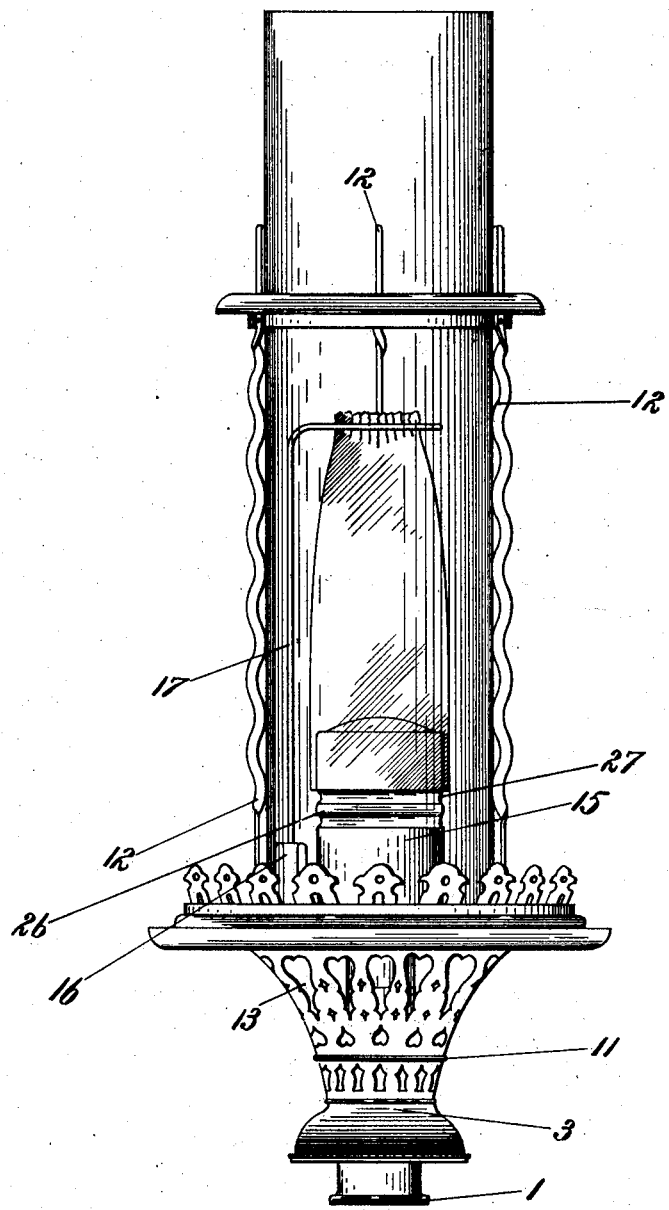

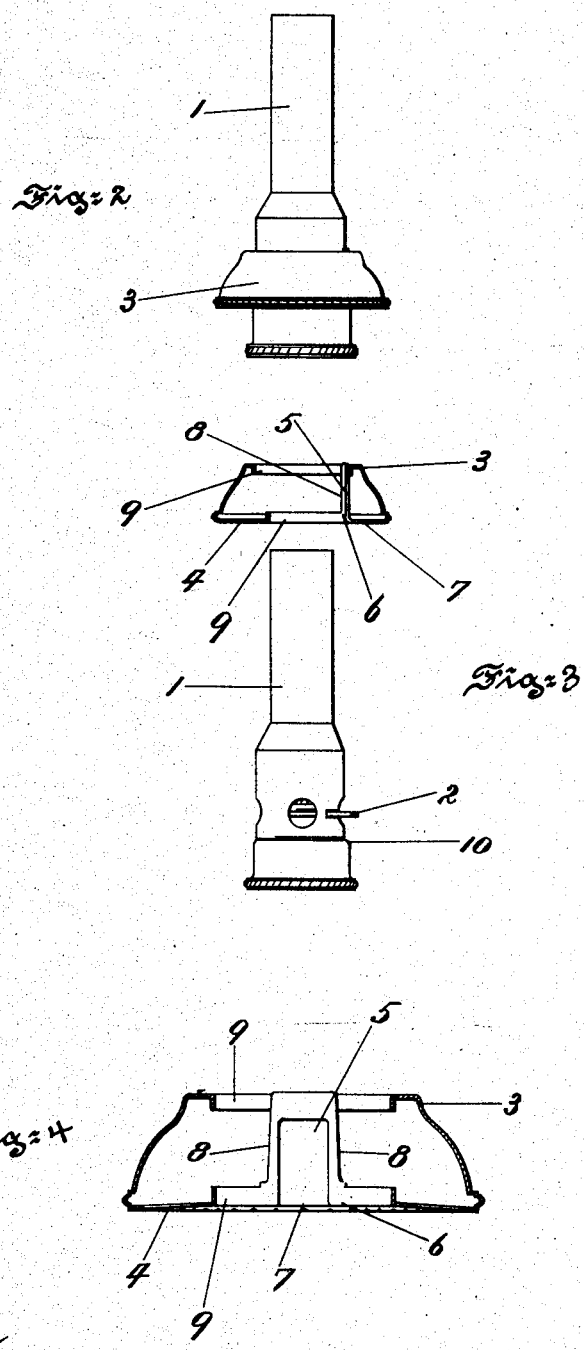

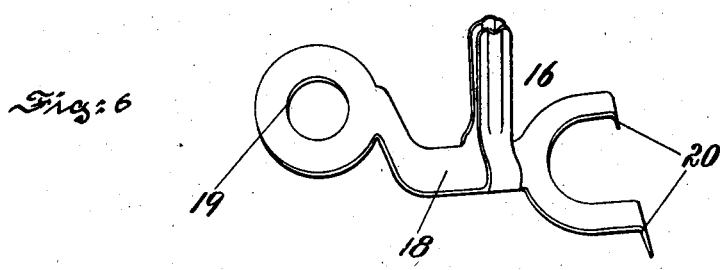
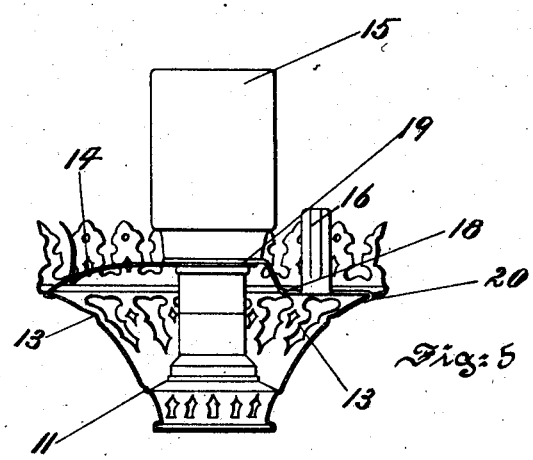

No. 761,331. PATENTED MAY 31, 1904.
T. STITES.
BURNER.
APPLICATION FILED JULY 28, 1902.
NO MODEL. 5 SHEETS—SHEET 5.
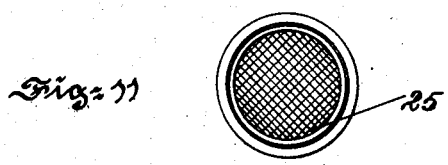
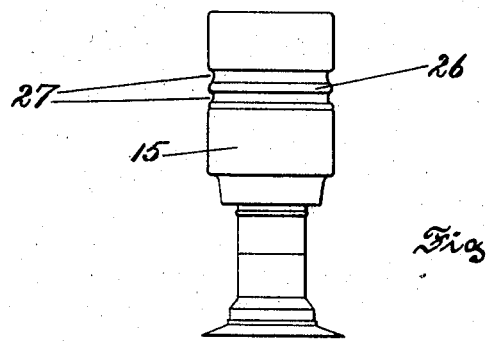
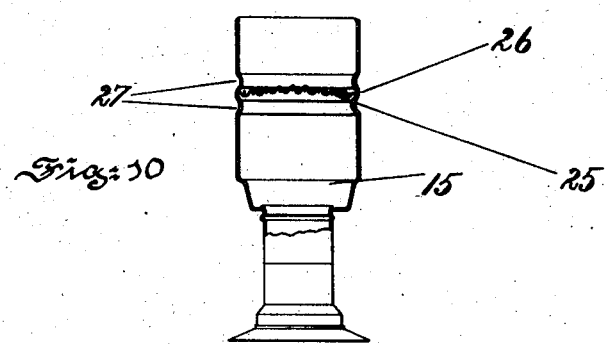

No. 761,331.

Patented May 31, 1904.

UNITED STATES PATENT OFFICE.

TOWNSEND STITES, OF GLOUCESTER, NEW JERSEY, ASSIGNOR TO WELSBACH LIGHT COMPANY, OF GLOUCESTER CITY, NEW JERSEY, A CORPORATION OF NEW JERSEY.

BURNER.

SPECIFICATION forming part of Letters Patent No. 761,331, dated May 31, 1904.

Application filed July 28, 1902. Serial No. 117,238. (No model.)

*To all whom it may concern:*

Be it known that I, TOWNSEND STITES, a citizen of the United States, residing at Gloucester, in the county of Camden and State of New Jersey, have invented certain new and useful Improvements in Burners, of which the following is a specification.

One object of the present invention is to improve and simplify burners such as are used in connection with Welsbach and other incandescent mantles.

Another object of the invention is to provide a burner capable of easy alteration so as to increase its field of usefulness by adapting it to various conditions, such as the employment of mantles fitted with rods which have to be held in sockets or with mantles fitted with collars which encircle the burner-head or such as arise from different gas-pressures.

Another object of the invention is to provide for the convenient and satisfactory regulation of the gas-supply.

Another object is to facilitate the application of the mantle-supporting rods to their holders; and another object of the invention is to provide a standard type or construction of burner which by removal or addition to its parts or other simple modifications can be made to meet the requirements which arise in practice.

To these and other ends hereinafter set forth the invention comprises the improvements to be presently described, and particularly pointed out in the claims.

The nature, characteristic features, and scope of the invention will be more fully understood from the following description, taken in connection with the accompanying drawings, forming part hereof, and in which—

Figure 1 is an elevational view of a burner embodying features of the invention. Fig. 2 is a similar view of the Bunsen tube and wind-guard without the other parts of the burner. Fig. 3 is a view showing the wind-guard in section and detached from the Bunsen tube. Fig. 4 is a sectional view drawn to an enlarged scale and illustrating features of construction of the wind-guard. Fig. 5 is an elevational view of the burner-head, showing the gallery in section and illustrating the spring-socket for the side support or rod of the mantle. Fig. 6 is a perspective view of the socket drawn to an enlarged scale. Fig. 7 is a sectional view of the burner-head, showing a removable baffle-plate. Fig. 8 is a perspective view drawn to an enlarged scale and illustrating the baffle-plate. Fig. 9 is an elevational view of a burner-head. Fig. 10 is a sectional view of the same, and Fig. 11 is a plan of the same.

In the drawings, 1 is a Bunsen tube, and it is fitted, Fig. 3, with a gas-check 2, which when turned in one direction increases the flow of gas through the Bunsen tube and which when turned in the other direction decreases the flow of gas. The part designated by the reference-number 2 is clearly shown on the drawings, and for a description of the rest of the device, which is well understood, reference may be had to Letters Patent to Moreau and Mason, No. 569,139, of October 6, 1896, which show a well-known type.

3 is a wind-guard mounted so as to rotate around the Bunsen tube and provided with openings 4, which permit of the passage of the necessary supply of air to the interior of the Bunsen tube, and with an imperforate top plate or part which prevents the flame from striking down from the outside and igniting the gas at the air-inlets of the tube. This wind-guard is operatively connected with the gas-check 2, so that when the wind-guard is turned it shifts the gas-check and regulates the gas; but, as shown, it does not regulate the supply of air. The wind-guard is provided with a notch 5, that engages the part 2. This notch 5 is shown as formed by bending or striking a U-shaped piece 6 up from the bottom of the wind-guard. The base of the wind-guard may be notched, as at 7, in line with the opening between the arms 8. This construction permits the wind-guard to be dropped over the Bunsen tube 1 into such position that the parts 8 engage the gas-check 2. Around the top and bottom of the wind-guard there are flanges 9. The flanges afford a nice fit in respect to the Bunsen tube. The Bunsen tube is provided with a seat 10, upon which the wind-guard is seated so as to be capable of motion of rotation. The gallery 11 is supported above the wind-guard, and it may be provided with the chimney-guide 12 or with any parts that are ordinary provisions of the gallery, and of course the chimney-guide may be omitted. The gallery itself is shown to consist of perforated walls 13 and of arms 14, which extend from its rim inward to the base of the burner-head 15.

16 is a spring-socket constructed to hold the side support or rod 17 of a mantle. Sometimes mantles with rods 17 are employed, and when that is done the spring-socket 16 is useful. Sometimes, however, the mantles are fitted with collars that engage the burner-head, and in those cases the socket 16 is not necessary. The spring-socket 16 is so constructed and arranged that it can be applied to the burner or not. To this end it consists of a body 18, arranged at one end for engagement with the burner-head and at the other end for engagement with the rim of the gallery. As shown, the body is fitted with a ring 19, through which the base of the burner-head passes, and with clips 20, which engage the rim of the gallery. Intermediate of its ends the body 18 is laterally provided with arms grooved at their ends and arranged parallel with each other, so as to constitute a split spring-socket into which the side support 17 may be placed and there held. The operation of placing the rod 17 in the described socket is simple and does not require the exercise of skill, because since the socket is spring-acting all that the operator has to do is to push the rod into the socket, one hand only being required for this operation, the other hand being free to hold the burner or to guide the top of the rod 17.

Under certain conditions of relation of gas-pressure and air-supply burners are somewhat noisy, and the presence or absence of a gauze or baffle below the gauze, which is at the top of the burner, sometimes affords means for correcting this noisy tendency. In Fig. 8 is shown a baffle consisting of a plate 21, having upwardly and outwardly extending arms 22, the upper ends of which engage beneath the cap 23, that carries the ordinary gauze 24, with the top rim of the burner-head 15. The plate 21 is of proper size to afford passage for the mixture of air and gas around it, and although three arms 22 are shown their number may be increased or diminished.

Referring to Fig. 10, 25 is a baffle consisting of a gauze detachably connected with the burner-head by the provision upon the latter of an annular seat or knurl 26, formed between two grooves 27 and into which the gauze is sprung. The baffle-gauze 25, as well as the baffle-plate 21, may therefore be conveniently applied or removed, as desired, in order to attain the proper conditions.

It will be obvious to those skilled in the art to which the invention relates that modifications may be made in details without departing from the spirit thereof. Hence I do not limit myself to the precise construction and arrangement of parts hereinabove set forth and illustrated in the accompanying drawings; but,

Having thus described the nature and objects of the invention, what I claim as new, and desire to secure by Letters Patent, is—

1. A burner provided with a gas-check and with a guard operatively connected with the check, substantially as described.

2. A burner provided with a Bunsen tube having a gas-check, and a guard rotatably mounted on the Bunsen tube and engaging the check, substantially as described.

3. A burner provided with a Bunsen tube having a gas-check and a seat, and a guard rotatably mounted on said seat and engaging the check, substantially as described.

4. A burner provided with a Bunsen tube having a gas-check, a guard rotatably seated upon the tube and engaging the check, and a gallery mounted on the tube above the guard, substantially as described.

5. A burner provided with a gas-check and a guard provided with a notch for engaging the check, substantially as described.

6. A burner provided with a Bunsen tube having a gas-check, and a guard mounted on the tube and provided with arms 8, which engage the check, substantially as described.

7. A burner provided with a Bunsen tube having a gas-check, and a guard provided with a U-shaped part of which the arms engage the check, substantially as described.

8. A burner provided with a spring tubular socket comprising a body portion having lateral spring-arms provided with grooved end portions arranged parallel, substantially as described.

9. A burner provided with a spring-socket comprising a body portion having engaging means at its ends and having intermediate of its ends arms provided with grooved end portions arranged parallel, substantially as described.

10. A burner provided with a spring-socket comprising a body portion having at one of its ends a ring and at the other of its ends clips and having intermediate of its ends arms provided with grooved end portions arranged parallel, substantially as described.

11. A burner provided with a burner-head having at its top the usual cap and gauze, and a baffle located beneath the said gauze and provided with arms of which the upper ends engage beneath the cap with the top rim of the burner-head, substantially as described.

In testimony whereof I have hereunto signed my name.

TOWNSEND STITES.

Witnesses:
 GEO. S. BARROWS,
 L. E. SMITH.